Figure 1:
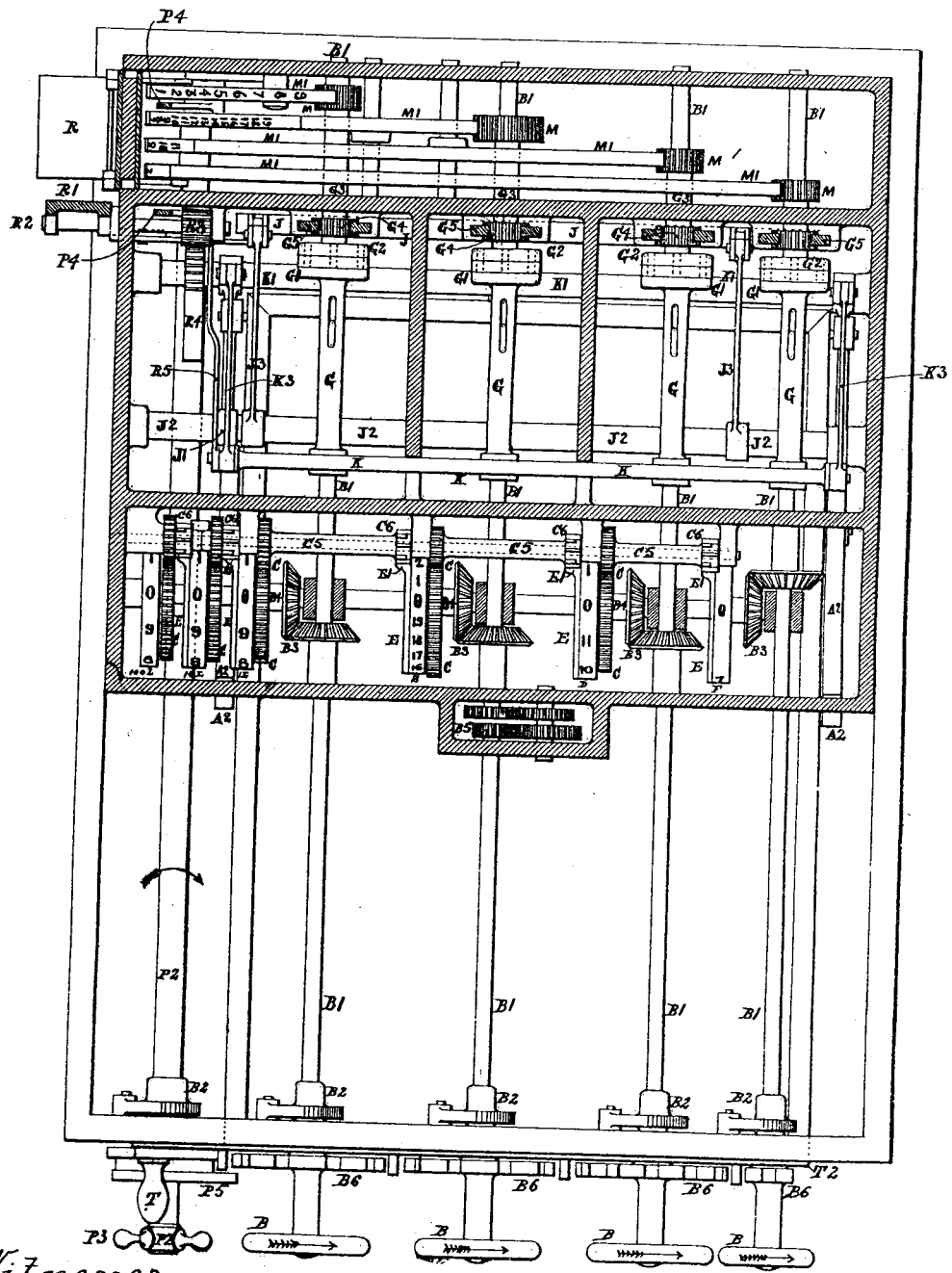

(No Model.)

3 Sheets—Sheet 1.

R. LAMONT.
CASH REGISTER, INDICATOR, AND CHECK PRINTER.

No. 485,951. Patented Nov. 8, 1892.

Witnesses
George Baumann
James Gracie

Inventor
Robert Lamont
By his Attorneys
Howson and Howson

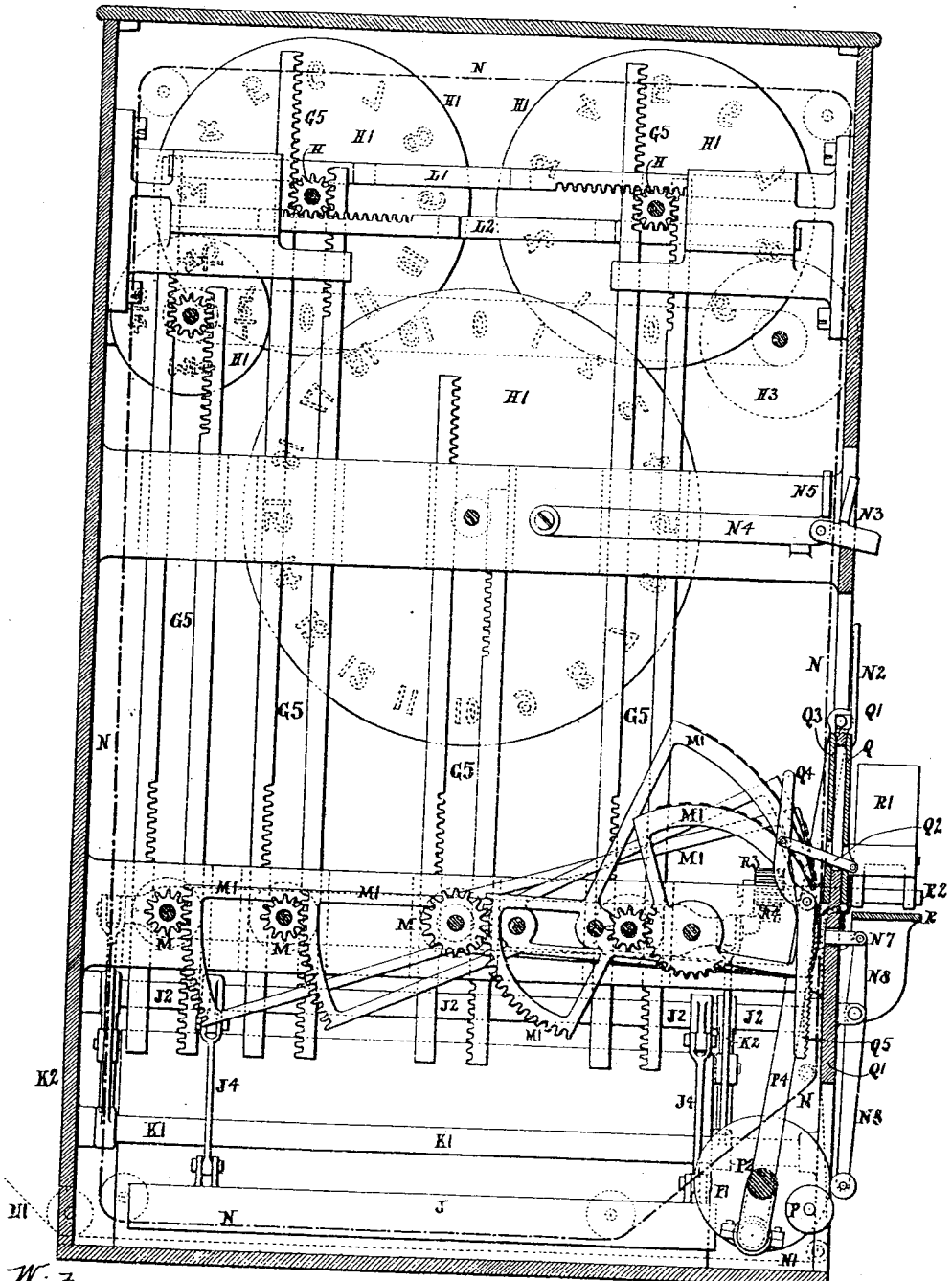

(No Model.)
R. LAMONT.
CASH REGISTER, INDICATOR, AND CHECK PRINTER.
No. 485,951. Patented Nov. 8, 1892.
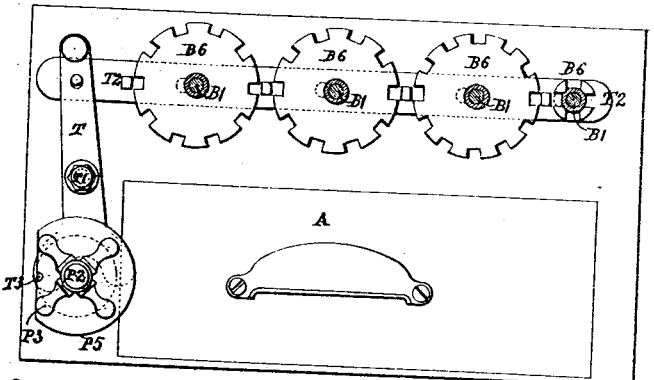
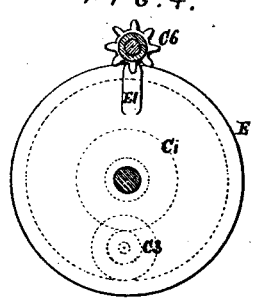
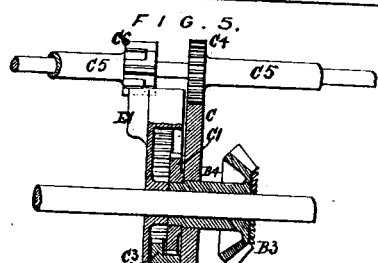
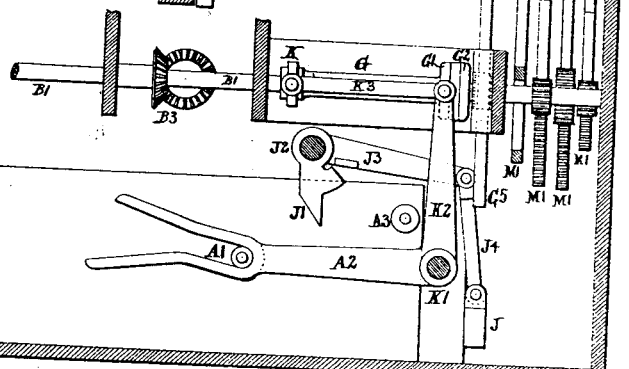
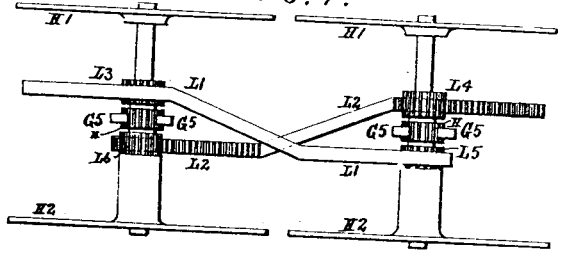
Witnesses
George Baumain
James Gracie
Inventor
Robert Lamont
By his Attorneys
Howson and Howson

United States Patent Office.

ROBERT LAMONT, OF KILMARNOCK, SCOTLAND.

CASH REGISTER, INDICATOR, AND CHECK-PRINTER.

SPECIFICATION forming part of Letters Patent No. 485,951, dated November 8, 1892.

Application filed May 3, 1892. Serial No. 431,623. (No model.)

*To all whom it may concern:*

Be it known that I, ROBERT LAMONT, a subject of the Queen of Great Britain and Ireland, and a resident of Kilmarnock, county of Ayr, Scotland, have invented certain Improvements in Apparatus for Counting or Adding, Indicating, and Recording Cash or other Quantities, of which the following is a specification.

My said invention has for its object to improve the construction of apparatus for counting or adding, indicating, and recording cash or other quantities, so as to render the same more accurate and convenient and useful for checking and other purposes.

My improved apparatus comprises hand-wheels, by means of which the quantities to be dealt with are made to be indicated and recorded; also, special mechanism for "carrying" quantities—as from units to tens, for example—without interfering with the action of the parts to which the quantities may be said to be carried; also, indicating-disks showing the quantities corresponding to the movements given to the hand-wheels; also, reversed indicating-disks showing the same quantities on the opposite side of the apparatus; also, printing appliances for recording the quantities; also, devices for setting the indicating-disks to zero; also, a drawer for receiving cash and devices connecting the drawer with other parts of the apparatus, and also other details hereinafter described in connection with the main parts.

In order that my said invention and the manner of performing the same may be properly understood, I hereunto append three sheets of explanatory drawings, to be hereinafter referred to in describing my improved apparatus.

Figure 1 of the drawings is a horizontal section, the front of the apparatus being at the bottom. Fig. 2 is a vertical section as taken near the back of the apparatus and as viewed toward the front and showing the backs of indicating-disks which face the operator, the reversed disks facing the other way being supposed to be removed. Fig. 3 is an elevation of the front end, which does not extend up as high as the back part. Figs. 4 and 5 are enlarged face view and section of one set of the carrying parts. Fig. 6 is a vertical section of some parts as at right angles to Fig. 3. Fig. 7 is a plan of parts by which some of the reversed disks are actuated.

My improved mechanism may be arranged in a casing of any suitable form and plain or ornamental externally. The casing (partly shown in the drawings) is of a rectangular form in plan and also in elevation; but the top of the front or that facing the operator (a shop salesman, for example) is lower than that of the back part. In the lower front part there is a drawer A for putting in cash. In the front of the upper back part there are openings in which appear numerals indicating quantities, and in the other side of the back part—that is in the outer side—which will be in view of a customer if the apparatus is placed on a shop-counter, openings for showing like numerals, but reversed in order, so as to be properly seen on the outer side. Various spindles and other details of the mechanism are carried in metal or other frames, bars, or brackets in the manner usual in clockwork or in any other suitable manner. For brevity's sake some expressions—such as "adding," "carrying," and the like—are used as signifying the mechanical actions corresponding to such operations.

At the front above the drawer A there are hand-wheels B, which the operator turns to the extents corresponding to the numbers of the quantities to be indicated and otherwise dealt with, these hand-wheels being on horizontal spindles B', which have on them ratchet-wheels B², prevented by pawls from turning excepting in the direction indicated by arrows. Each spindle B' by a pair of bevel-wheels B³ turns a sleeve or elongated boss B⁴, running loose on a spindle and passing (excepting the case of the extreme right-hand spindle) loosely through a spur-wheel C, on the inner side of which spur-wheel the boss has fixed on it a smaller spur-wheel C'. On a pin C², fixed in the larger spur-wheel C, there is a loose planet-wheel C³, which is in part a pinion gearing with the wheel C' and in part a larger pinion gearing with internal teeth formed on a rimmed disk or counter-wheel E. The parts of this gearing are proportioned so that any angular (that is, rotative) movement of the wheel C' produces an equal but reversed movement of the rimmed disk E. When a quantity is carried forward from parts dealing with lower quantities—as from pence to shillings, for example—it is communicated to the larger spur-wheel C by a pinion C⁴ on a tubular spindle C⁵, and through the action of the pin C² and of the planet-wheel C³ gives a proper movement to the rimmed disk E without turning the smaller wheel C', this wheel being, in fact, held stationary by the friction of the parts connected with it, except when turned by means of its proper hand-wheel B. Each rimmed disk E effects the carrying forward once for each complete turn by means of the well-known device fully shown in Figs. 4 and 5. Each tube C⁵ has on its right-hand end a pinion C⁶, with some of its teeth longer than the others, and when not turning resting on the edge or rim of the disk E. The disk E has formed on it a projecting part E', formed with two teeth to gear with the pinion C⁶ and with a notch between those teeth extending sufficiently to allow one of the longer teeth of the pinion to pass round, these longer teeth preventing the turning of the pinion excepting when the part E' passes. The several rimmed disks or counter-wheels E (shown in Fig. 1) have numerals marked on their outer surfaces. These are, however, not for the ordinary indications, but for showing the summation of a number of separate sums or quantities, and they may be covered by a shutter ordinarily locked and accessible only to the proprietor or manager of the establishment. The disks represent, severally, hundreds, tens, and units of pounds, shillings, pence, and farthings, as indicated by the reference letters and numerals 100£ 10£ 1£ s d f in Fig. 1. The "farthing" parts having nothing carried to them, the bevel-wheel B³ and rimmed disk E are fixed and turn together, and as there is no reversal between them the bevel-wheel on the spindle B' is reversed, as compared with the others. The "shilling" rimmed disk E having to turn once for twenty separate numbers, and it being inconvenient to similarly turn the corresponding hand-wheel B, a set of toothed wheels B⁵ is introduced to turn the bevel-wheels B³ once for two turns of the hand-wheel B.

The hand-wheel spindles B' are continued through beyond the parts described in the preceding paragraph and have on them tubes or sleeves G, made with clutch-disks G' at their back ends. Each clutch-disk G' has fixed in it a number of pins, (indicated by dotted lines in Fig. 1,) and which, passing through holes in a middle disk formed on the spindle B', project when in the engaging position into holes in a clutch-disk G² on the front end of a tube or sleeve G³, having on it a pinion G⁴. The several pinions G⁴ gear with vertical rack-bars G⁵, which at their upper ends gear with pinions H, turning with front or inner indicating-disks H', the several indicating-disks being arranged in positions suitable for showing numerals at openings situated in a line across the front of the higher part of the casing. This arrangement will be easily understood on considering Fig. 2, in which the backs of these disks are shown, the numerals being indicated by dotted lines. Thus farthings are shown at the outer part of the horizontal diameter of the disk, pence and pounds at the bottoms of the vertical diameters, and shillings at the top of the vertical diameter. When indicating, the vertical rack-bars G⁵ at the left-hand side in each case, as seen in Fig. 2, descend and the right-hand bars ascend, and the disks H' are restored to zero positions by a horizontal bar J, which, rising, pushes up any lowered left-hand bar, the corresponding right-hand bars then descending and encountering the bar J, thereby acting as stops and preventing the left-hand bars from being jerked up too far. Before, however, the disks H' can be turned back the clutch-disks G' G² must be disengaged, which action is effected by means of a bar K, engaging in grooves in enlarged parts at the front ends of the clutch-tubes G. The manner of moving the bars J and K is hereinafter explained.

Two of the reverse disks H², which are shown in plan in Fig. 7, and which indicate at openings in the outer vertical face of the casing, are moved by means of horizontal rack-bars L' L², carried in guides and gearing with pinions appertaining to the several disks. The front pence and pound disks H' are fast on spindles, having on them pinions L³ L⁴, gearing each with one end of a rack-bar L' L², and the other end of each rack-bar gears with a pinion L⁵ L⁶ on the tubular boss of each of the reverse indicating-disks H². As the rack-bars L' L² cross each other, they are arranged to gear on opposite sides of the pinions. The reverse shilling-indicating disk does not require reversal of motion, but merely to have the numerals properly shown on it. The reverse farthing-indicating disk H³ (indicated by dotted lines in Fig. 2) is turned by an endless band or pitch-chain from a pulley or sprocket-wheel turning with the front farthing-disk.

For recording or printing any amount or sum shown by the counter-wheels E or indicating-disks H', the pinion-tube G⁸ on each hand-wheel spindle B', and which is engaged and disengaged by means of the clutch-tube G, acts by means of a pinion M on it on a double open sector M', having printing-type on its outer arc. The arrangement is shown in Figs. 1, 2, and 6. The pinions M act on toothed arcs at the inner ends of the several double sectors M', which are centered on spindles and made open in a manner to clear the various spindles, while they are of different sizes, suitable for bringing all the printing-arcs together at the side of the casing. In Fig. 2 the sectors M' are shown all with their zero-types (at the bottoms of their arcs) in the printing position, and when any number is indicated on a disk H' the corresponding sector is brought into the printing position.

Any suitable known kind of inking apparatus may be adopted—as, for example, an ink-ribbon applied as in many type-writers. In Fig. 2 such an ink-ribbon N is shown by peculiar dotting as passing round guide-pulleys round an extended circuit within the casing of the apparatus, this ribbon passing between the types and the paper to be printed. The paper shown by a dotted line N' in Fig. 2 is drawn off an external roll (not shown) and passes round guide-pulleys along the bottom of the casing and up to the printing position at the right-hand side, as seen in Fig. 2. At the proper time the paper is struck against the ink-ribbon and type by an impression-bar N⁷ at the upper end of a lever N⁸, moved by a tappet-roller P on a disk P', fixed on a cranked shaft P², which the operator turns by means of a handle P³, Fig. 1, at its front end. The cranked part of the shaft P² is connected by a pair of rods P⁴ to a slide Q, guided to work on the outer side of a fixed plate Q', which is formed with a slot having passing through it a rod Q², jointed at its outer end to the slide Q and passing through a short slot in an inner slide Q³ to a lever Q⁴, centered on the inner slide and forming part of a serrated plate Q⁵. When the outer slide Q, which is shown in its lowest position, is moved upward, it first by the rod Q² and lever Q⁴ closes the gripping-plate Q⁵ on the paper, and then the inner slide Q⁶, moving upward by the action of the rod Q², carries up the gripping plate and paper, the paper passing out through a curved slit through the fixed plate Q'. The paper passes out onto a small table R, and on the return downward movement of the slide Q is cut off by a knife fixed on the lower part of that slide and acting against a knife fixed to the fixed plate Q'. While on the table R the paper may have the shopkeeper's name or advertisement printed on it by a plate R', fixed on a spindle R² and turned down at the proper time by means of a pinion R³ on that spindle acted on by a rack R⁴, connected by a rod R⁵ to the clutch-bar K. At each printing action the ink-ribbon N is moved by the action of a rod N² on the outer slide Q on an outer gripping-plate N³, jointed to a lever N⁴, which has at its end an inner gripping-plate N⁵, the ribbon being between the plates N³ N⁵.

When the operator has by turning the hand-wheels B caused a certain sum to be indicated, he has in order to bring about the succeeding operations to move a handled lever T at the left-hand side of the drawer A, Fig. 5, toward the right. The lever T, which is centered on a fixed stud T', moves a bar T², which has on it studs adapted to engage in notches in wheels B⁶ on the hand-wheel spindles B', so as to lock those spindles. At the same time the lever T moves a pin T³ on its lower part out of a notch in a disk fast on the shaft P², and this shaft can then be turned.

A complete turn must be given to the shaft P² and the notch brought round into proper position for receiving the pin T³ before the lever T can be moved so as to release the hand-wheel spindles B', a pawl acting on a ratchet-wheel B² on the shaft preventing it from turning except in one direction.

On the shaft P² there is a disk P⁵, which prevents the drawer A from being opened except when the shaft is turned half-round to bring a cut-away part of the disk to the side next the drawer. When the drawer A is drawn out, an antifriction-roller A' on its side acts on one cam-shaped inner side of the fork of a lever A², fast on a rocking shaft K', and levers K² on this shaft by rods K³ move the clutch-bar K. When the drawer A is returned inward, the other side of the fork of the lever A² is acted on by the roller A', so as to move the clutch-bar K back again. Another antifriction-roller A³ on the side of the drawer acts on a lever J', loose on a rocking shaft J², and as the drawer moves out simply turns and passes the lever J', letting it drop. On the inward movement of the drawer the roller A³ moves the lever J' backward, and then a projection on the lever engages a lever J³, fast on the rocking shaft J², and moves the shaft, the roller ultimately passing the loose lever J' and again letting it drop. The lever J³ and a second like it on the shaft J² are connected by rods J⁴ to the bar J, hereinbefore referred to as returning the indicating-disks H' H² to their zero positions.

When an operator is about to put a payment into the drawer A, he first turns the hand-wheels B to correspond with the amount; secondly, after moving the lever T gives half a turn to the shaft P², acting on the printing appliance; thirdly, opens the drawer, puts in the cash, and closes the drawer again, and, finally, gives the shaft P² a second half-turn. The cycle of movements may, however, be arranged in any other convenient way.

Any of the devices hereinbefore described may be modified by the substitution of known or obvious equivalents.

What I claim as my invention is—

1. In apparatus for counting or adding, indicating, and recording cash or other quantities, the combination of the following parts, namely: hand-wheels B on spindles B', bevel-wheels B³, which turn bosses B⁴, loose on a spindle passing through spur-wheels C, smaller spur-wheels C', fixed on the bosses B⁴, planet-wheels C³ on pins C², fixed in the spur-wheels C and gearing with the spur-wheels C' and with counter-wheels E, pinions C⁴ on tubular spindles C⁵, gearing with the spur-wheels C, projecting parts E' on the counter-wheels E, engaging with pinions C⁶ on the spindles C⁵, also tubes G on the spindles B', clutch-disks G' thereon, and clutch-disks G² on tubes G³, having pinions G⁴ gearing with vertical rack-bars G⁵, which gear with pinions H, fixed to front indicating-disks H', reverse indicating-disks H², actuated through horizontal rack-bars L' L², pinions L³ L⁴ L⁵ L⁶, and a pitch-chain from the drivers of the front disks H', also horizontal bars J and K, actuated, as described, to put the indicating-disks to zero, also pinions M on the tubes G³, acting on sectors M', provided with type, an inking-ribbon N, moved as described, also paper feeding, impressing, and reversing devices, as described, and also a drawer A for receiving the cash, and in connection therewith devices for locking the spindles B' and devices for acting on other parts, as described, the several parts being arranged and operating substantially as and for the purposes herein set forth.

2. In the carrying mechanism, the combination of the following parts, namely: hand-wheels B on spindles B', bevel-wheels B³, turning bosses B⁴, loose on a spindle passing through spur-wheels C, smaller spur-wheels C', fixed on the bosses B⁴, planet-wheels C³ on pins C², fixed in the spur-wheels C and gearing with the spur-wheels C' and with counter-wheels E, pinions C⁴ on tubular spindles C⁵, gearing with the spur-wheels C, and projecting parts E' on the counter-wheels E, engaging with pinions C⁶ on the spindles C⁵, the several parts being arranged and operating substantially as herein set forth.

3. In an indicating mechanism, the combination of the following parts, namely: tubes G on spindles B', clutch-disks G' thereon and clutch-disks G² on tubes G³, having pinions G⁴, gearing with vertical rack-bars G⁵, which gear with pinions H, fixed to front indicating-disks H', reverse indicating-disks H², actuated through the horizontal rack-bars L' L², pinions L³ L⁴ L⁵ L⁶, and a pitch-chain from the drivers of the front disks H', also horizontal bars J and K, actuated, as described, to put the indicating-disks to zero, the several parts being arranged and operating substantially as and for the purpose herein set forth.

4. In cash registering, indicating, and recording machines, the combination of spindles B', tubes G³, and clutch mechanism adapted to connect the said tubes to the spindles with pinions M on the said tubes G³, sectors M', actuated by the pinions M and provided with type, all substantially as and for the purposes set forth.

5. In cash-recording machines, the combination of sectors M', provided with type and means for actuating same with a strip of paper, an inking-ribbon, and rotatable disk P', provided with a roller P, an impression-bar N⁷, and lever N⁸, actuated by the roller P to actuate in turn the impression-bar, all substantially as and for the purposes set forth.

6. In a cash-recording machine, the combination of sectors M', provided with type and means for actuating same with a strip of paper, an inking-ribbon, and rotatable disk P', provided with a roller P, an impression-bar N⁷, and lever N⁸, actuated by the roller P to actuate in turn the impression-bar, a table R, spindle R², having affixed thereto a plate R', and means for turning the spindle, all substantially as and for the purposes set forth.

7. In a cash-recording machine, the combination of sectors M', provided with type, means for actuating the same, a strip of paper, and an inking-ribbon with a crank-shaft P², slides Q and Q³, bars P⁴, connecting the slide Q with the crank-shaft, gripping-plate Q⁵, having a lever Q⁴ and pivoted to the slide Q³, and the lever Q², passing through an opening in the slide Q³ and connecting the slide Q with the lever Q⁴, all substantially as and for the purposes set forth.

8. In a cash-recording machine, the combination of sectors M', provided with type, means for actuating the same, a strip of paper, and an inking-ribbon with a crank-shaft P², slides Q and Q³, bars P⁴, connecting the slide Q with the crank-shaft, gripping-plate Q⁵, having a lever Q⁴ and pivoted to the slide Q³, a lever Q², passing through an opening in the slide Q³ and connecting the slide Q with the lever Q⁴, the said slide Q being provided with a cutting-knife adapted to act with a stationary knife fixed to the framing, all substantially as and for the purposes set forth.

9. In a cash-recording machine, the combination of sectors M', provided with type and means for actuating same, a strip of paper, and an inking-ribbon with a crank-shaft P², a slide Q, arms P⁴, connecting the slide Q with the crank-shaft P², a rod N² on the said slide, lever N⁴, provided with a gripping-plate N⁵ and having pivoted thereto a gripping-plate N³, the said gripping-plates N³ N⁵ adapted to be actuated by the rod N² to grip the inking-ribbon and carry it forward, all substantially as set forth.

10. In a cash-recording machine, the combination of the sectors M', provided with type, means for actuating the same, a strip of paper, and an inking-ribbon with a crank-shaft, an impression-bar N⁷, gripping-plate Q⁵, gripping-plates N³ N⁵, and suitable connections whereby the said bar N⁷ and the gripping-plates Q⁵ N³ N⁵ are actuated by the rotation of the said crank-shaft, substantially as set forth.

11. In a cash-recording machine, the combination of the cash-drawer, with a shaft P² to actuate the printing devices when rotated and a disk P⁵, fixed to the said shaft, the said disk P⁵ having a cut-away portion and adapted to prevent the drawer from being opened except when the cut-away portion is turned toward the drawer, and a spindle B', having notched disks B⁶ fixed thereto, a bar T², having studs adapted to engage in the notches of the disks B⁶, and a lever T, adapted to move the bar T² and provided with a pin T³, adapted to lock the said shaft P², all substantially as and for the purposes set forth.

12. In a cash-indicating, registering, and recording machine, the combination of spindles B', gear-wheels G⁴, adapted to be turned forward by the said spindles, racks G⁵ to operate the indicating mechanism and gearing with the wheels G⁴, with a drawer having a friction-roller A³, a bar J, and lever connections J' J² J³ J⁴, adapted to be actuated by the said roller A³ to raise the bar J to turn the racks G to their normal positions, all substantially as set forth.

13. In a cash registering and indicating machine, the combination of hand-wheel having secured thereto spindles B'; pinions B³ to actuate the registering mechanism, tubes G, capable of longitudinal movement on the spindles, but adapted to rotate therewith, and tubes G³, loose on the spindles B' and having pinions G⁴ to actuate the indicating devices with mechanism adapted to connect the tubes G with the tubes G³ and means for disengaging these tubes from each other while the indicating devices are being returned to zero, substantially as and for the purposes set forth.

14. In cash indicating, registering, and recording machines, the combination of hand-wheel spindles B', provided with pinions B³ to actuate the registering mechanism, tubes G, capable of longitudinal movement on the spindles B', but adapted to rotate therewith, and tubes G³, loose on the spindles B' and provided with pinions G⁴ and M to actuate the indicating and recording devices, respectively, with mechanism adapted to connect the tubes G with the tubes G³ and means for disengaging these tubes while the indicating and recording devices are being returned to zero, substantially as and for the purposes set forth.

In testimony whereof I have signed my name to this specification in the presence of two subscribing witnesses.

ROBERT LAMONT.

Witnesses:
 EDMOND HUNT,
 DAVID FERGUSON.